United States Patent [19]

Mackin et al.

[11] Patent Number: 5,666,905
[45] Date of Patent: Sep. 16, 1997

[54] ANIMAL PRODUCTION BUILDING AND METHODS OF PRODUCING ANIMALS AND PROCESSING ANIMAL WASTE

[75] Inventors: Robert J. Mackin, Grabill, Ind.; Thomas A. Menke, Greenville, Ohio

[73] Assignee: EnviroLogic, Inc., Greenville, Ohio

[21] Appl. No.: 488,730

[22] Filed: Jun. 8, 1995

[51] Int. Cl.⁶ .................................................. A01K 1/01
[52] U.S. Cl. ................................. 119/448; 119/450
[58] Field of Search ................................. 119/436, 442, 119/447, 448, 450, 521, 529, 530, 172, 72, 74

[56] References Cited

U.S. PATENT DOCUMENTS

| | | | |
|---|---|---|---|
| 3,371,652 | 3/1968 | Louks et al. | 119/51.11 |
| 3,762,372 | 10/1973 | Mente et al. | 119/448 |
| 3,919,976 | 11/1975 | Meyer et al. | 119/447 |
| 4,060,054 | 11/1977 | Blair | 119/447 |
| 4,173,947 | 11/1979 | Whiteside, Jr. | 119/457 |
| 4,252,083 | 2/1981 | Gilst et al. | 119/51.11 |
| 4,325,326 | 4/1982 | Schierenbeck | 119/530 |
| 4,329,939 | 5/1982 | Christie et al. | 119/528 |
| 4,387,666 | 6/1983 | Thye-Lockenberg | 119/530 |
| 4,442,792 | 4/1984 | Nehring | 119/444 |
| 4,706,607 | 11/1987 | Ijichi et al. | 119/447 |
| 5,145,460 | 9/1992 | Smith, Jr. | 119/448 |

*Primary Examiner*—Robert P. Swiatek
*Assistant Examiner*—Elizabeth Shaw
*Attorney, Agent, or Firm*—Lundy and Associates

[57] ABSTRACT

An animal production building which has animal living quarters with a floor at least partially slatted with a manure deposition area beneath the slatted floor, a ventilation system which provides air motion through the animal quarters downwardly into the manure deposition area and through the manure deposited therein and outwardly of the building which processes the manure with bulking agents into a dry organic nutrient. A method of processing animal waste is also provided including the steps of providing animal quarters over a waste deposition area, depositing animal waste into the waste deposition area, removing the water from the waste, drying the waste, and mixing the waste with a bulking agent.

29 Claims, 6 Drawing Sheets

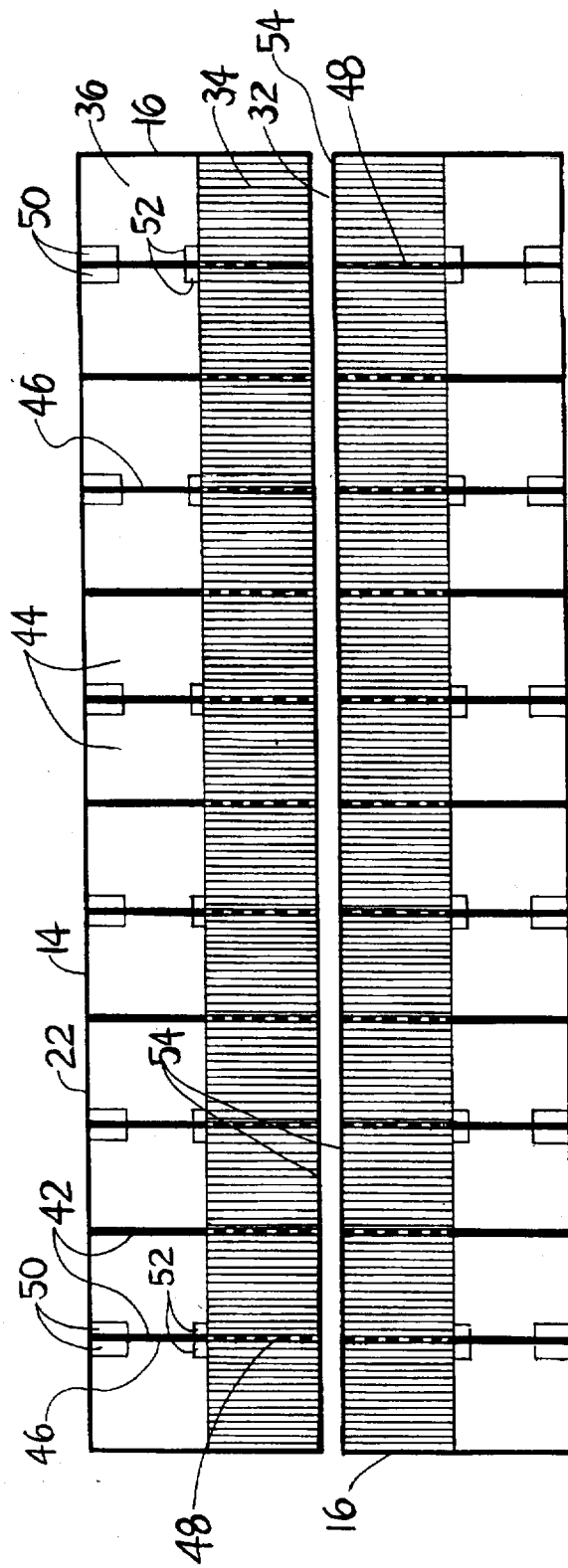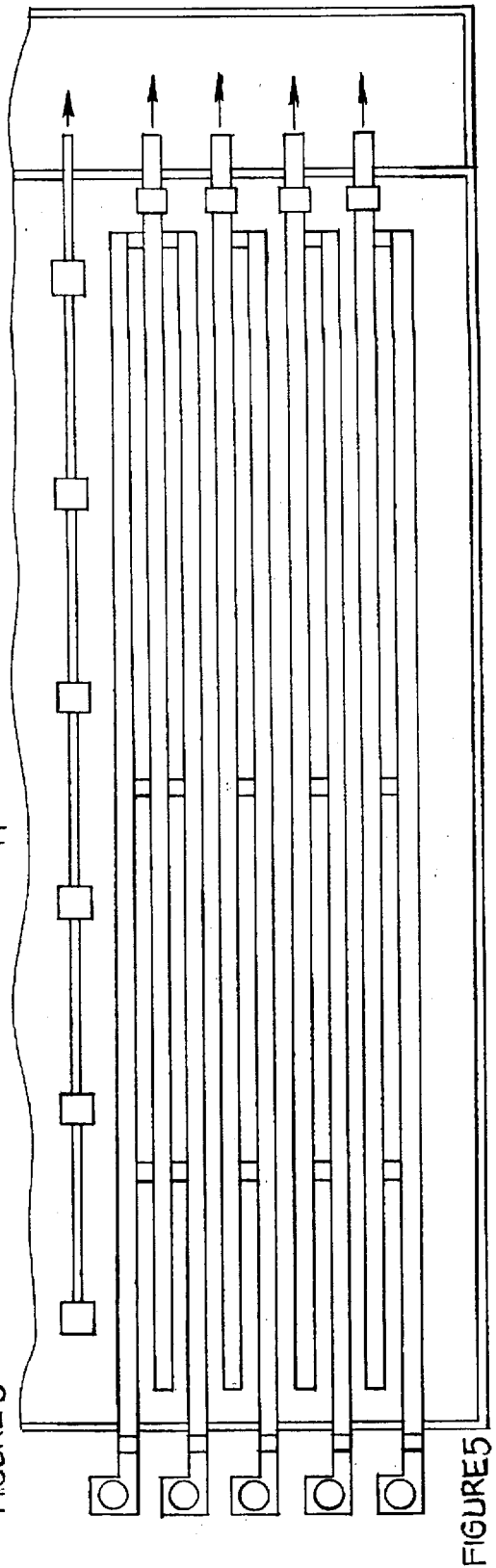

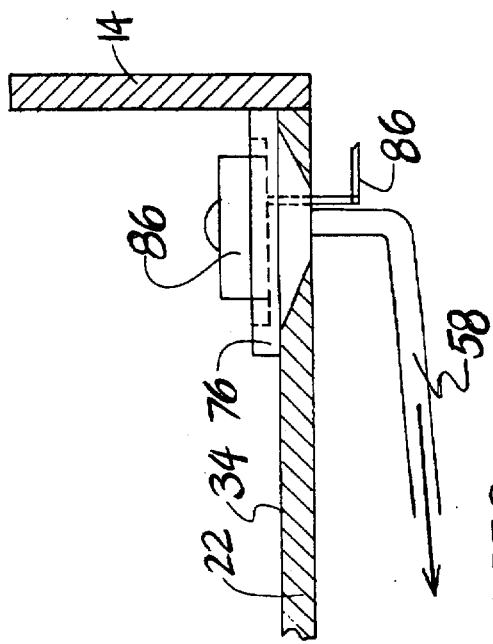
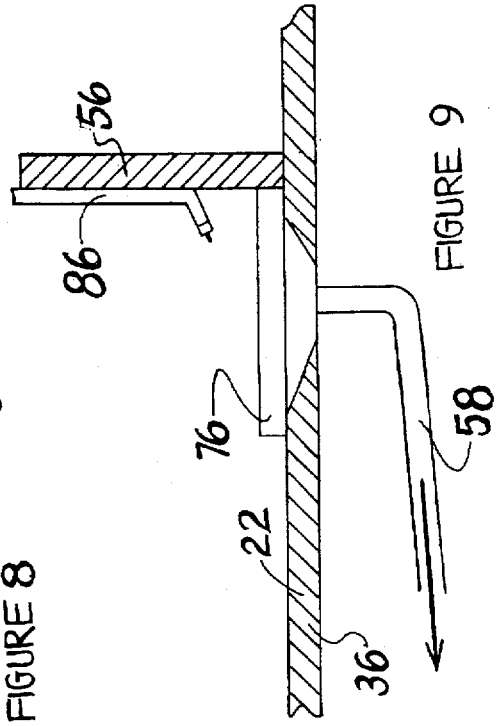
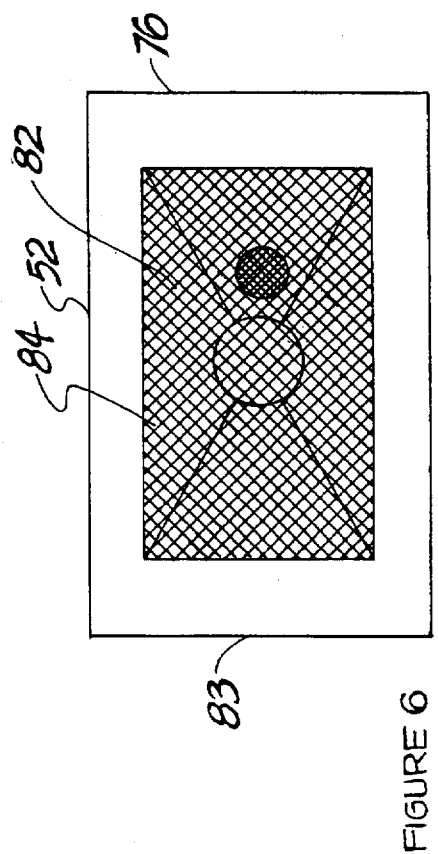
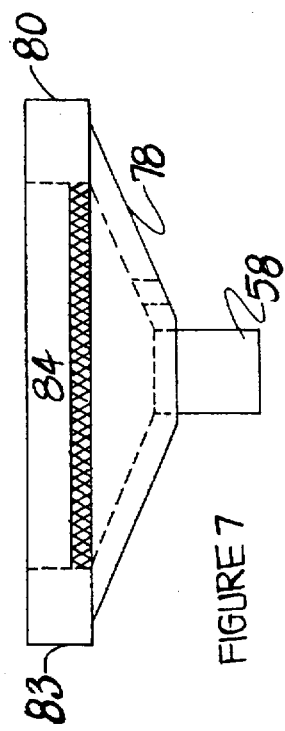

ANIMAL PRODUCTION BUILDING AND METHODS OF PRODUCING ANIMALS AND PROCESSING ANIMAL WASTE

BACKGROUND OF THE INVENTION

The invention relates to a new and improved animal production building and more particularly relates to an production building in which animals can be efficiently produced, and methods pertaining thereto by which animal waste can be efficiently dried and/or composted for further economical use.

Numerous animal production buildings have hereto been proposed. A great number of chicken coops, swine finishing houses, and cattle barns have been proposed whereby animals can be produced utilizing a facility dedicating a minimal of square footage area per animal. However science has suggested improvements in animal production where by animals may be more efficiently produced and animal production buildings may be enhanced to maximize profits. It is therefore highly desirable to provide improved animal production building and method. It is also highly desirable to provide an improved animal production building in which enhancements science has provided can be implemented to maximize production, reduce costs and protect the adjacent environment.

Waste management from large modern animal production buildings has also been a problem. Chicken manure, hog manure and cattle manure have all been used for fertilizing material. Waste management has in recent years trended to the collection and holding of some manures, particularly some, as liquids. However, both the environmental and social considerations concerning the storage and application of liquid waste have questioned long term viability of such systems. It has also been reported in scholarly journals that the drying and/or composting of manures may solve some of the environmental and social problems. Therefore, it is highly desirable to provide an improved animal production building which allows the manure to be collected and stored as a dried solid material, and an improved method for processing animal manure.

It is also highly desirable to provide an improved animal production building in which animals can be efficiently produced and their manure processed all in accordance with state-of-the-art science.

It is also highly desirable to provide an improved method and animal production building by which animals can be efficiently produced and their manure can be efficiently treated in accordance with the method of this invention, simultaneously.

It is also highly desirable to provide an improved method for treatment of animal waste material which improves the nutrient properties of the waste material.

It is also highly desirable to provide an improved method for the treatment of animal manure which increases the transportability of the product and its use in broader land applications.

It is also highly desirable to provide an improved animal production building in which animal density may be enhanced by properly ventilating and disposing manure from the building.

It is also highly desirable to provide an improved animal production building and method for animal production and manure disposal in which manure is produced into a dried fertilizing material while enhancing the storage and transportation of the same for broadened use applications.

It is also highly desirable to provide an improved animal production building and method for animal production which combines an improved drainage system and forced air systems within the animal production area of the building and the manure processing area of the building.

It is also highly desirable to provide an animal production building and method for animal production and manure processing which dries the manure, collects the waste water and stores the manure free of liquid.

Finally it is highly desirable to provide an improved animal production building, method for animal production and method for manure processing having the applicability for improved production of swine, poultry and cattle or any other type of animals having all of the above features.

SUMMARY OF THE INVENTION

It is therefore an object of the invention to provide an improved animal production building and method.

It is also an object of the invention to provide an improved animal production building in which the enhancements science has provided can be implemented to maximize production, reduce costs and protect the adjacent environment.

It is also an object of the invention to provide an improved animal production building which allows the manure to be collected and stored as a dried solid material, and an improved method for processing animal manure.

It is also an object of the invention to provide an improved animal production building in which animals can be efficiently produced and their manure processed all in accordance with state-of-the-art science.

It is also an object of the invention to provide an improved method and animal production building by which animals can be efficiently produced and their manure can be efficiently treated in accordance with the method of this invention, simultaneously.

It is also an object of the invention to provide an improved method for treatment of animal waste material which improves the nutrient properties of the waste material.

It is also an object of the invention to provide an improved method for the treatment of animal manure which increases the transportability of the product and its use in broader land applications.

It is also an object of the invention to provide an improved animal production building in which animal density may be enhanced by properly ventilating and disposing manure from the building.

It is also an object of the invention to provide an improved animal production building and method for animal production and manure disposal in which manure is produced into a dried fertilizing material while enhancing the storage and transportation of the same for broadened use applications.

It is also an object of the invention to provide an improved animal production building and method for animal production which combines an improved drainage system and forced air systems within the animal production area of the building and the manure processing area of the building.

It is also an object of the invention to provide an animal production building and method for animal production and manure processing which dries the manure, collects the waste water and stores the manure free of liquid.

It is finally an object of the invention to provide an improved animal production building, method for animal production and method for manure processing having the applicability for improved production of swine, poultry and cattle or any other type of animals having all of the above features.

In the broader aspects of the invention there is provided an improved animal production building which has animal living quarters with a floor at least partially slatted with a manure deposition area beneath the slatted floor, a ventilation system which provides air motion through the animal quarters downwardly into the manure deposition area and through the manure deposited therein and outwardly of the building which processes the manure with bulking agents into a dry organic nutrient.

A method of processing animal waste is also provided including the steps of providing animal quarters over a waste deposition area, depositing animal waste into the waste deposition area, removing the water from the waste, drying the waste, and mixing the waste with a bulking agent.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings herein:

FIG. 3 is a top plan view of a typical living quarters of the building shown in FIG. 1 for finishing swine with the roof removed.

FIG. 5 is a fragmentary top plan view of the manure deposition area and the lower floor existing beneath the animal production area shown in FIGS. 1 and 2 with both the roof and the animal production area removed;

FIG. 6 is a top plan view of one of the waterers of the building of FIGS. 1–4;

FIG. 7 is a side view of the waterer of the building shown in FIG. 6;

FIG. 8 is a partial cross-sectional view showing a water bowl and the waterer of FIGS. 6 and 7 installed in the building of FIGS. 1–4;

FIG. 9 is a partial cross-sectional view showing a nipple waterer and the waterer of FIGS. 6 and 7 installed in the building of FIGS. 1–4.

DESCRIPTION OF A SPECIFIC EMBODIMENT

Figure 1:
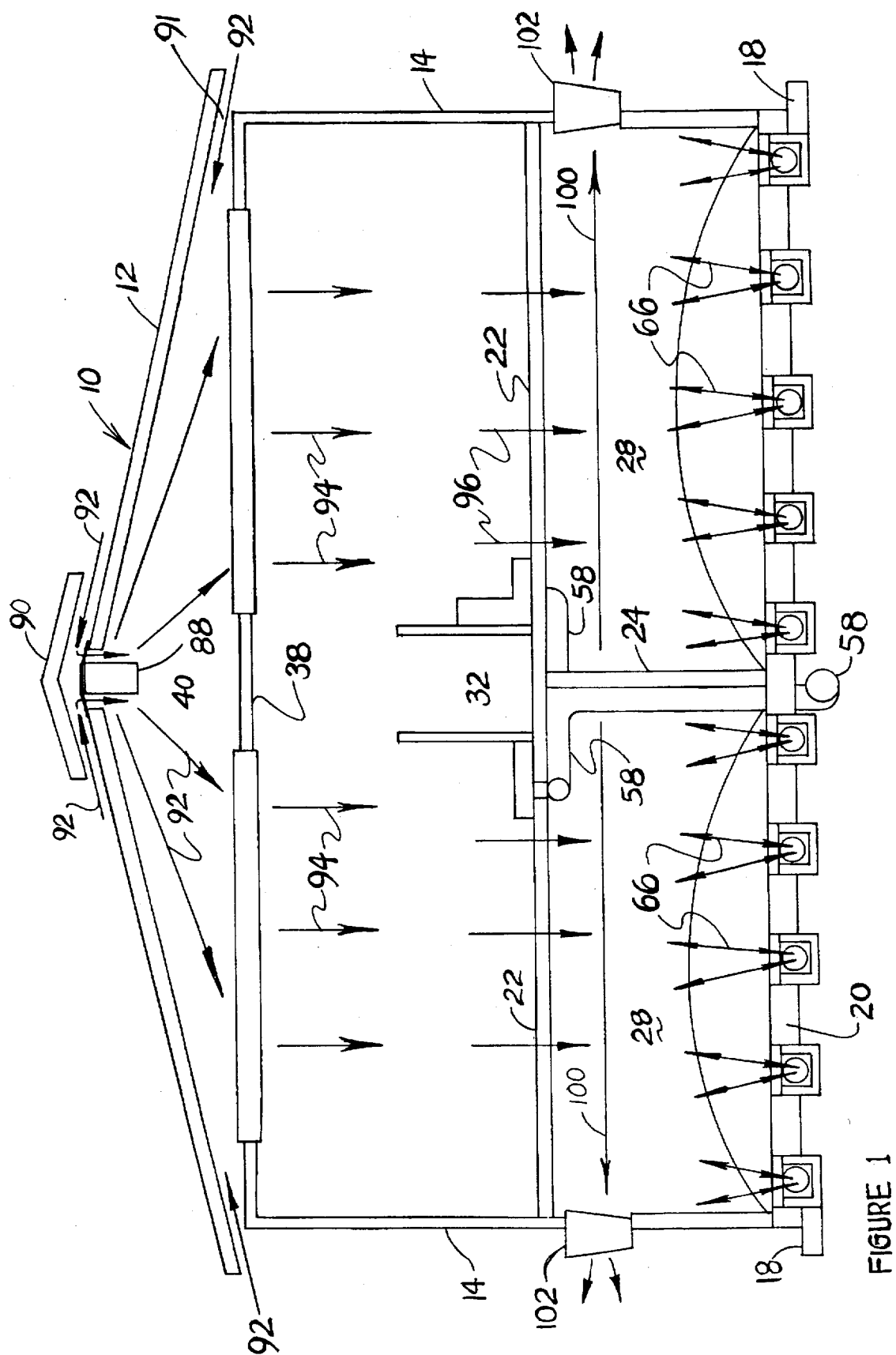
FIG. 1 is an end view of the improved animal production building of the invention with the end wall removed specifically designed for efficient swine or cattle finishing.

Referring to FIG. 1 there is shown an improved animal production building 10 of the invention in the form of a swine or cattle finishing building. Building 10 has a roof 12, side walls 14 and end walls 16 supported on footings 18. Walls 14 and 16, roof 12 and footing 18 can all be constructed in a conventional manner.

Building 10 has a lower floor 20 and an upper floor 22 which is suspended above lower floor 20 between side walls 14. In a specific embodiment, floor 22 is supported by one or more dividers 24 extending longitudinally of building 10 essentially the entire length of the building. Dividers 24 may not only support the floor 22 above lower floor 20, but may divide the lower floor into manure deposition areas 28 on opposite sides of any divider 24. Manure deposition areas 28 extend longitudinally of the building 10 essentially the entire length of the building.

Floor 22 extends over the entire floor 20 between opposite side walls 14. Slatted floor areas 34 are provided on both sides of isle 32 and directly over the manure deposition areas 28.

In a specific embodiment designed for swine production, shown in FIG. 3, slatted floor areas 34 separate isle 32 from solid floor areas 36 which are positioned adjacent side walls 14. Slatted floor areas 34 are generally horizontal as is lower floor 20 and the floors in isles 26 and 32. Solid floor areas 36 adjacent side walls 14 may be sloped downwardly towards the slatted floor areas 34 such that solid floor areas 36 can be scrubbed clean with water solutions and the water will drain through the slatted floor areas 34 into the manure deposition areas 28. In other specific embodiments, for cattle production solid floor areas 36 may be totally eliminated as shown in FIG. 4.

Suspended above the floor 22 may be a ceiling 38. Ceiling 38 generally extends generally horizontally between side walls 14. Ceiling 38 is porous to air flow therethrough for reasons to be mentioned hereinafter. Ceiling 38 and roof 12 define an attic 40 therebetween which spans the entire building between side walls 14 and end walls 16.

Figure 4:
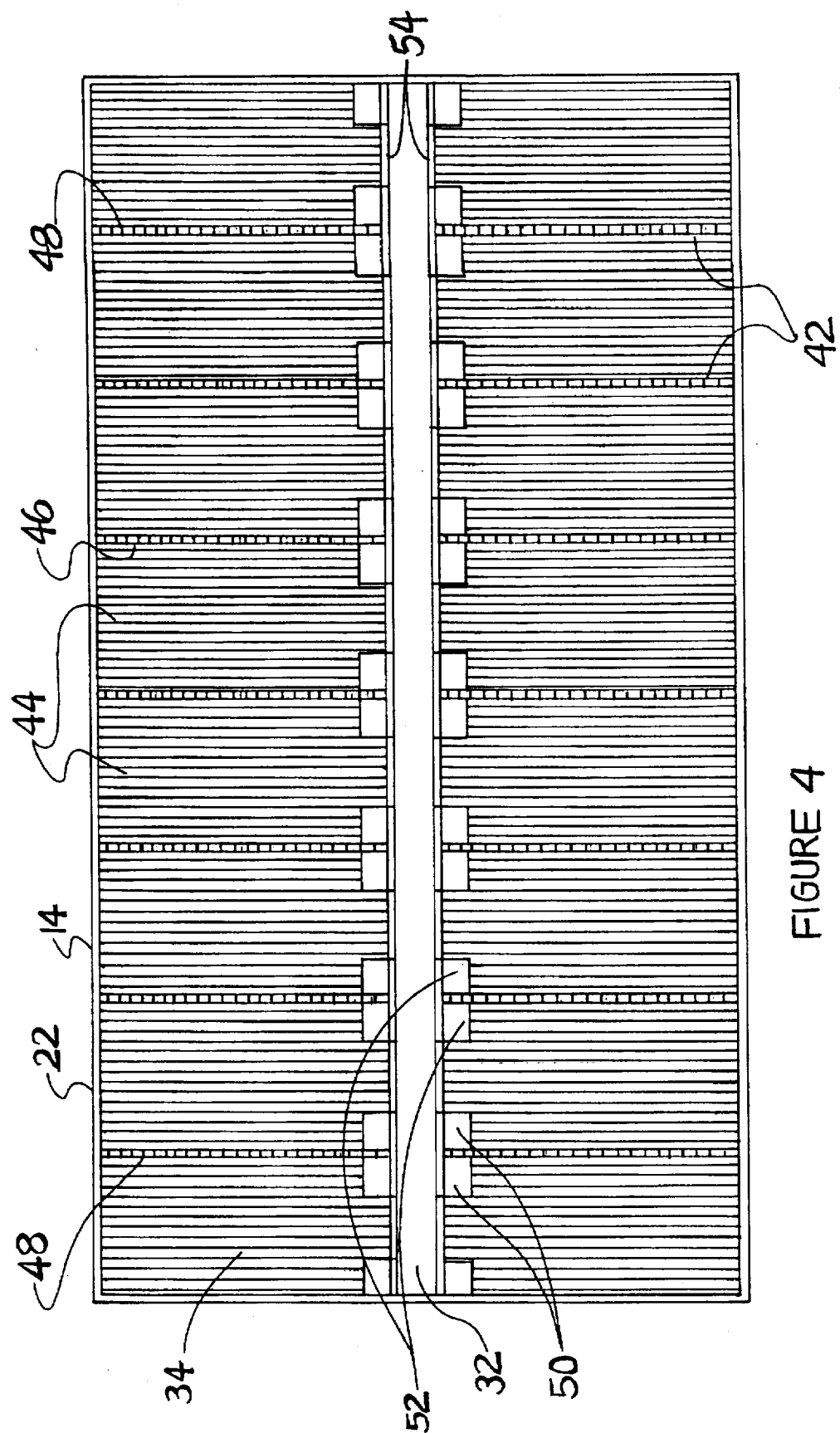
FIG. 4 is a top plan view like FIG. 3 showing a typical living quarters for cattle protection.
Figure 10:
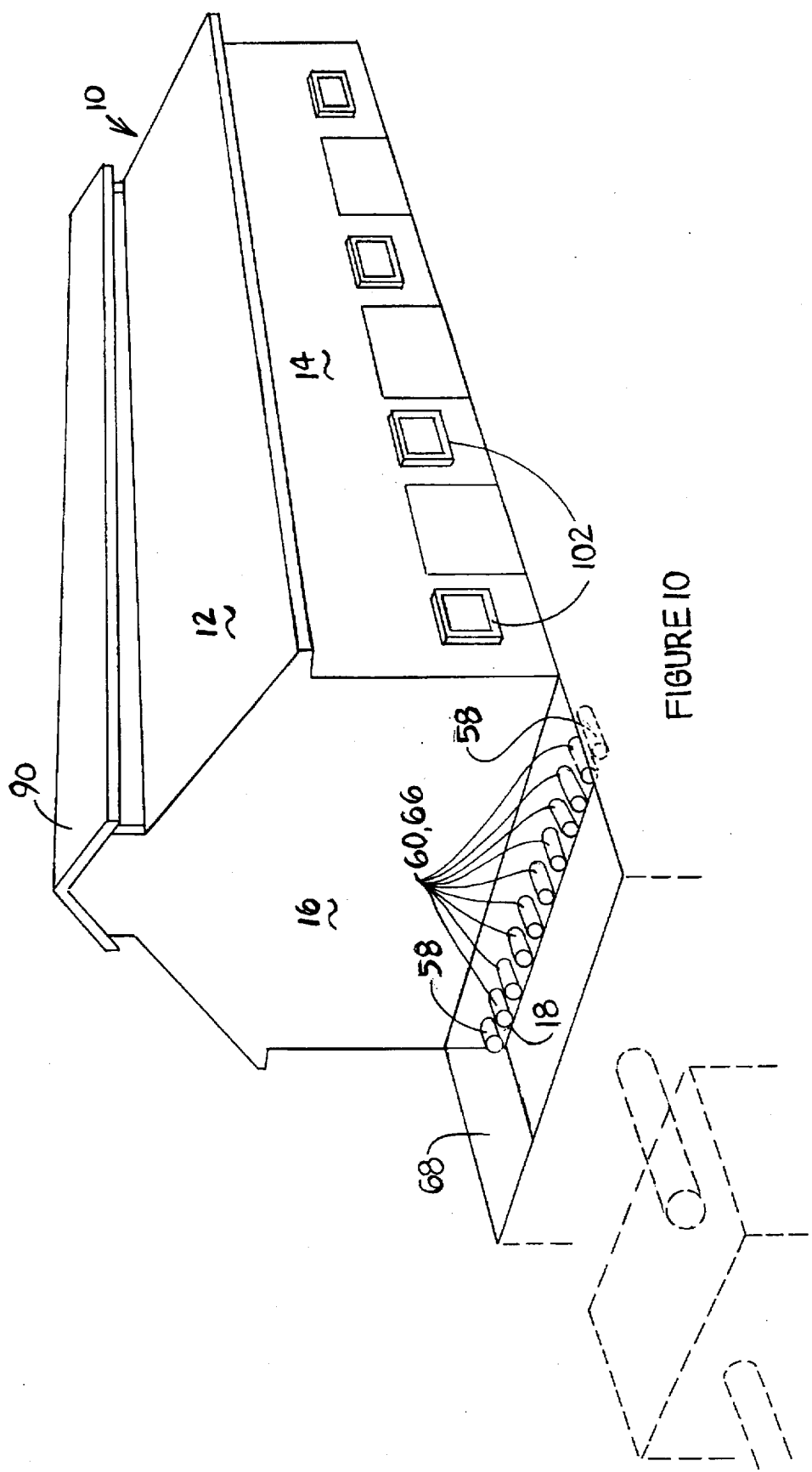
FIG. 10 is a prospective view showing the animal production building of the invention with water collection facilities.

Referring to FIGS. 3 and 4, floor 22 is shown to include a plurality of partitions 42 extending between side walls 14 and aisle 32 defining with end walls 16 a plurality of stalls or pens 44. Partitions 42 may include a solid pen divider portion 46 and an open pen divider portion 48. In embodiment illustrated, solid pen divider portions 46 extend from side wall 14 the length of solid floor portion 22. Open pen partition portions 48 extend from aisle 32 the length of slatted floor portions 34. In other embodiments, portions 46 and 48 may vary in length or be all solid or open or be eliminated entirely. Each pen 44 extends between a side wall 14 and aisle 32. Each pen 44 is equipped with a feeder 50 and a waterer 52. In a specific embodiment, pens or stalls 44 may be of different lengths and widths. In the specific embodiment shown in FIG. 2 The floor 22 is completely removed beneath poultry cages as will be described hereinafter. In other specific embodiments, feeders 50 are positioned on opposites sides of partition portions 46, 48 or adjacent side walls 14 or divider portions 48 and waterers 52 are positioned on opposite sides of alternate portions 46, 48 adjacent aisle 26. Each of the pens 44 are closed by aisle gates 54.

Figure 2:
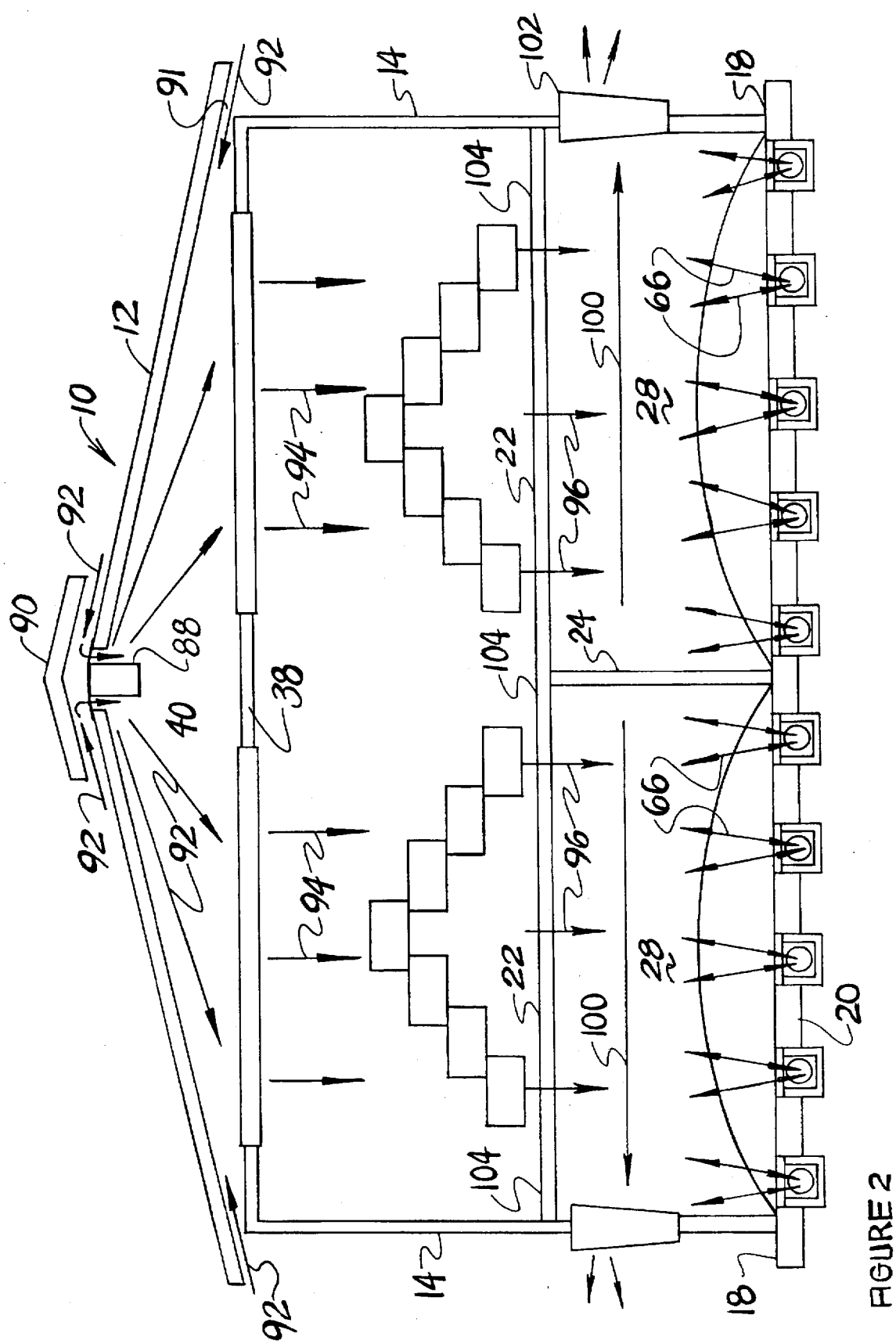
FIG. 2 is view like FIG. 1 specifically designed for poultry production.

Referring to FIGS. 1, 2 and 5 the lower floor 20 is shown to have spaced apart manure deposition areas 28. Beneath the floor 20 and the concrete dividers 24, there is positioned at least one drain line 58. Drainage line 58 is interconnected to each of the waterers 52 to carry away waste water therefrom and deposit the same in a waste water storage pit 68.

Positioned beneath the manure deposition areas 28 are a plurality of drainage tiles 60 extending longitudinally thereof. Extending between the tiles 60 are forced air lines 62 which are interconnected to air blowers or vacuum pumps 64. Air lines 62 are interconnected with the drainage tiles 60, in the specific embodiment illustrated, such that drain lines 60 function both as a drain of the moisture collecting on the floor 20 within the manure deposition areas 28 and a plenum by which air under pressure is forced up through the floor 20 and the manure deposited thereon within the manure deposition areas 28 or sucked down through the manure as suggested by the arrows 66 in FIGS. 1 and 2.

Located exterior of the building adjacent end 16 is a waste water storage pit 68 into which both the drainage tiles 60 and the drainage pipe 58 empty. Each of the drainage tiles 60 have water drainage extensions 66 extending into waste water pit 68. Each extension 66 has a valve 70 therein which when open, tiles 60 drain into pit 68, and when closed form plenums of tiles 60 as above-mentioned.

Within each manure deposition area 28 there may be mounted on floor 20 an unloading plate (not shown) for moving end to end of the manure deposition areas 28. The unloading plate is designed to both lift and mix the manure within the deposition area and to unload the processed manure from one end thereof, as desired. In other specific embodiments, the mixing and lifting of the manure is done manually by tractors and floor 20 is provided without obstruction over its entire width and length between walls 14, 16 and dividers 24.

Referring to FIGS. 6–9, the waterers 52 are shown mounted on the floor 22 in the pens or stalls 44. As shown in FIG. 8, waterer 52 may be mounted in the slatted floor portion 34, or as shown in FIG. 9 may be mounted in the solid floor portion 36. In either event, each of the waterers 52 includes a waterer pad 76 with a frusto-conical bottom 78 and an upper pan 80. Pan 80 is secured to the bottom 78 with a grate 82 therebetween.

As shown in FIGS. 8 and 9, bottom 78 is set into the floor 22, the pan 80 being supported by the floor 22. Pan 80 has upstanding sides 83 which defines a bowl therebetween for collecting waste water from the waterer 52. Bottom 78 is connected into the waste water drain 58. A water source 86 is centrally located within the bowl 84. Water source 86 in a specific embodiment may be a water bowl as shown in FIG. 8 or a nipple waterer as shown in FIG. 9. In either event, the water source 86 is located within the bowl 84 such that the bowl 84 will collect all of the spillage from the waterer 52.

The ventilation system of the improved animal production building 10 of the invention shown in FIG. 1 comprises air intake fans 88 mounted in the attic 40 to bring outside air in through a air intake capula 90 in the center of the roof 12 and running the full length of the building or through eave vents 91. Alternatively, cupula 90 and/or eave vents 91 could be eliminated and in other specific embodiments, air intake fans 88 could be mounted at the top of side walls 14. In all embodiments, air intake fans 88 are provided in suitable number to provide suitable air flow through the building. Fans 88 are spaced apart the full length of the building such that air is moved within the attic 40 as suggested by the arrows 92.

Air pressure is created within the attic 40 and the animal quarters so as to move air relatively evenly through the ceiling 38, the animal living quarters and slatted floor areas 34 as suggested by the arrows 94. Air is directed as suggested by the arrows 96 through the slatted floor section 34 into the manure deposition area 28 on both sides of the aisle 32.

Air is also forced upwardly or downwardly through the manure deposited in the manure deposition area by blower/vacuum pump 64 through the air lines 62 and the plenums formed by the drainage tiles 60 as indicated by the arrow 66. The air flow indicated by the arrows 98 and the air flow indicated by the arrows 66 merge within the manure deposition area 28 and are exhausted through the side walls 14 as indicated by the arrows 100 and/or the floor 20 as indicated by the arrows 66. Side wall vents or fans 102 are located in the side walls 14 above and adjacent to footing 18. Blower pumps 64 are located exterior of the building. The vents or fans 102 and blower pumps 64 are balanced with the intake fans 88 such that the air flow through the building 10 is maintained without significant pressure buildup or stagnation.

In a specific embodiment, wherein air flow as suggested by the arrows 94 and the air flow upwardly as suggested by the arrow 66 is substantially equal in volume, the vent fans 102 have more capacity than the intake fans and the blower pumps 64.

In a specific embodiment, the improved swine finishing building as above described may have poured concrete footings 18, a poured concrete floor 20, a poured concrete divider 24, exterior walls 14, 16 and roof 12 of conventional 2×4 and 2×6 lap siding and asbestos shingle construction. Upper floor 22 may be poured concrete construction or of metal construction or wooden construction when provides. Ceiling 38 may be any ceiling tile or a fabric which is permeable to air flow when required. The building 10 as shown may be 44 feet wide with each stall having a length of 20 feet with a 4 foot aisle 32. Each of the pens 44 being approximately 20 feet by 9 feet and housing approximately 24 hogs per pen giving a hog density of 7.5 square feet per hog. One specific embodiment of building 10 has 24 pens and is 216 feet long. the length of the building 10 depends upon the number of pens. For a building 10 of 26 feet in length waste water storage pit 68 may be approximately 15 feet by 44 feet in dimensions. The drains 58, drain tiles 60, blower pumps 64, valves 70, fans 88 and 102 and the like may be all conventional equipment as may be purchased at the time of construction.

In another specific embodiment in which the improved animal production building 10 of the invention is in the form of a poultry finishing building, the building 10 is slightly modified as shown in FIG. 2. Building 10, roof 12, side walls 14, walls 16, footing 18, lower floor 20, dividers 24, manure deposition areas 28, all are shown to be similar to the swine finishing building illustrated in FIG. 1 and thus bear the same reference numerals. Floor 22 however is entirely removed beneath the laying hen cages. Instead of floor 22, walkways are provided about stacked hen cages which are suspended from the ceiling 38 as shown. There is no floor beneath any of the cages in the poultry finishing building 10.

Walkways 104 are provided for maintenance of the cages. Walkways, are preferably slatted such that they can be easily cleaned and both the cleaning solution and the poultry manure can be drained through the walkways 104 into the manure deposition areas 28 therebelow. In the poultry finishing building 10, ceiling 38, roof 12, attic 40 and the ventilation system including air intake fans 88, air intake cupula 90, air flow through the building, air flow through the manure, air lines 62, plenums/drainage tile 60, and side wall vents or fans 102 all are provided in the poultry finishing building 10.

Additionally, below the laying hen cages, in the manure deposition areas, floor 20 is provided with drain line 58 connected to waste water storage pit 68, drainage tile 60, blower/pump 64 and air lines 62, and the manure mixing and unloading devices are each provided. However, the feeders 50, waterers 52 and the plurality of partitions and stalls or pens 44 are completely eliminated.

In another specific embodiment of the animal production building 10 of the invention in the form of a cattle finishing building, the animal production building 10 is provided with all of the features of the swine finishing shown in FIG. 1 with the exception that floor 22 is provided fully slatted and the pens or stalls 44 are provided in different dimension as dictated by proper cattle finishing procedures rather than swine finishing procedures and the waterers 52 and feeders 50 are exchanged for conventional cattle feeders and cattle waterers. See FIG. 2. In all other respects, the cattle finishing building 10 is the same as disclosed in FIG. 1 with regard to the swine finishing building 10.

In operation, the improved animal production building 10 of the invention functions to improve animal health and the production thereof and to improve manure handling and processing. Intimately linked with the improved manure processing system of the invention is the improved ventilation system of the invention, and a total control of all moisture in the building, whether from the animals or from waterers or from periodic cleaning of the building.

With regard to swine finishing, it is well known that dirty pens, poor removal of manure and other animal waste, poor ventilation and poor temperature control can all deleteriously affect the health and the reproduction and the finishing of the swine. By the ventilation system of the invention, air is moved relatively uniformly through the animal living quarters, through the slatted floor into the manure deposition areas 28 and out of the building via the vents 102 or the plenums 60. In this manner, the air within the animal living quarters is always fresh air and always available to the animals within the animal living quarters.

The animal living quarters of whatever configuration may be cleaned easily by washing allowing the waste and cleaning solution to pass into the manure deposition areas 28. The air flow through the building 10 as above described quickly dries the animal living quarters and the manure. In no occasion utilizing the animal production building 10 of the invention is the air which is forced through the manure deposition areas 28 to enter the animal living quarters. By the improved ventilation system, odor, dust and noxious gasses will not interfere with animal production and will not rise above the manure processing area.

The manure is processed into a dry product. This dry product is more easily handled, stored and transported than liquid product. All of the moisture generated in the animal production building 10 of the invention is removed either through the drainage tile in the floor 20 through the drain 58 connected to the waterers 52 or through evaporation and the air flow throughout the building. The manure deposition areas 28 has a floor with drainage tiles 60 therein and walls surrounding the floor which both (1) collects all excess free liquid that may fall into these areas 28 (from cleaning activities, water leaks, etc.) and drains any such liquid to a liquid storage pit 68 and (2) provides a plenum for air to be forced through the manure processing area to aid in drying the manure when not being used for liquid drainage. Valves 70 when in the closed position allow drainage tiles 60 to act as plenums for the forced air or vacuum system. Valves 70 are opened when the forced air or vacuum system is shut down and when tiles 60 are used for liquid drainage.

In a specific embodiment, the animal living quarters may be heated by the aerobic decomposition of the manure within the manure deposition areas 28. The heat generated rises through the slatted floor and generally heats the floor 22 and the animal living quarters. In this embodiment, precise temperature control is accomplished by controlling the air flow through building 10.

By the method of this invention, manure is fully dried and/or decomposed within the manure deposition areas 28 by mixing the manure with a bulking material maintained in the manure deposition areas 28 and passing air through the manure within areas 28. This bulking material may include straw, rice hulls, wood chips, shredded newspaper, or any other material that will absorb free liquid, provide air pore space when mixed with the manure and not add substances that will render the product unsuitable or less desirable as a organic nutrient source or soil enhancement material or combinations thereof. The depth of the bulking agent in the manure deposition area is calculated as a function of animal density and the length of time desired before the product is to be removed. By aeration of the mixture of manure and bulking agent both methane production and ammonia production is held to a minimum.

The manure in the manure deposition areas 28 is mixed with the bulking agent and most of the water is removed from the manure either through the drain tiles 60 in the floor 20 of the manure deposition area or through evaporation into the air flowing through the manure in the deposition areas 28 and out through the vents or exhaust fans 102 in the side walls 14 or the drainage tiles and air plenums 60 in floor 20 as above described. By controlling the air flow, the pens may be kept clean, even though cleaning may add moisture to the manure deposited in the manure deposition area, and the moisture content of the manure, the temperature and humidity of the air within the animal al living quarters can be relatively accurately controlled and the methane and ammonia production can be minimized and ventilated from the building.

The manure and the bulking agent are periodically mixed to move the wetter manure in the manure pile upwardly or downwardly to mix with relatively dry manure with the relatively wet manure pile, and to mix the manure with the bulking agent. This action is accomplished by the unloading plate being moved length wise of the building 10 within the manure deposition areas 28 or manually or by a tractor. In accordance with the invention, all of the manure and waste material from the animals quarters is deposited within the manure deposition area 28. Bulking agent is added to the manure and the manure and is periodically mixed thoroughly to mix relatively dry manure with relatively wet manure, to mix bulking agent with the manure, to drain the moisture therefrom through the drainage tile 60 and to evaporate the remainder of the moisture by the air flow through the manure pile as suggested by the arrow 66.

Manure in a specific embodiment is not only dried, but is at least partially aerobically fermented whereby the ammonia and methane within the air is exhausted through the air vents or exhaust fans 102. In a specific embodiment, the decomposting of the organic material and the bulking agent mixture produces heat which may rise, and controlling the air flow throughout the living quarters may maintain livable conditions throughout all seasons.

In accordance with the method of this invention, all of the animal manure and all of the waste material from the animal living quarters are deposited through the slatted or open floor portions into the manure deposition areas 28. The animal pens may be cleaned periodically and everything removed from the animal pens during the cleaning process, including the cleaning fluids themselves, are deposited through the slatted floor area into the manure deposition area. The manure, together with bulking agent in the manure deposition area are thoroughly mixed, periodically. In a specific embodiment, weekly. The amount of liquid deposited into the manure deposition area is minimized. The optimal waterers 52 limit the liquid being deposited into the manure deposition areas 28 to animal urine and feces, except when the pens are being cleaned.

The essence of the manure processing method of the invention is manure drying, at least partial biological fermentation and aerobic composting of the manure by which the manure is composted into a useful fertilizing material and dried so as to allow the fertilizing material to be packaged and transported, conveniently. By the flow of air through the manure in the manure deposition area, as indicated by arrows 66, cooling the manure pile and providing oxygen to the manure, at least partial aerobic decomposting and biological fermentation process occurs. The living quarters temperature is controlled by the airflow through the living quarters as indicated by arrows 96.

The aerobic decomposting and the biological fermentation of the manure minimizes the production of ammonia, methane and other noxious gases. This allows for the air from the manure deposition area 28 to be exhausted through exhaust fans 102 together with any noxious gases. In specific embodiments in which the animal production building 10 of the invention is located near populous areas, exhaust fans 102 may also include scrubbers of a conventional nature which exhaust to the atmosphere completely fresh air devoid of all noxious gages when desirable.

To control the aerobic decomposting and biological fermentation of the manure within manure deposition area 28, the feces must be mixed regularly with the bulking agents within the deposition area 28 and the temperature within the deposition area 28 and the moisture with the manure controlled to optimize the fermentation process.

Exhaust fans 102 must be large enough not only to exhaust the airflow through the building and not interrupt the desired airflow, but fans 102 must also maintain a desired humidity to maintain a desirable atmosphere within the entire building 10.

In a specific embodiment both the moisture content of the manure and the temperature of the manure may be controlled. If the manure temperature or air volume through the manure/bulking agent mixture is too low, there is not enough evaporation and the manure and the bulking agent will remain too wet. The ventilation must guarantee the exhaust of water vapor to maintain the humidity as desired. The carbon and nitrogen of the manure are converted into more stable components by the bacteria and fungi during the composting and aerobic fermentation process. The air flow through the manure mixture converts the nitrogen via aerobic nitrification and denitrification within the manure bulking agent mixture into a more stabilized form.

The improved animal production building and the method of processing animal manure of the invention provides a state-of-the-art environment for poultry or swine or cattle manure generated processing the manure generated into a form that allows handling, storage and disposal of the waste generated as a processed dried solid material while at the same time enhancing the productivity of the animals by removing the influence of manure gases.

This is all accomplished in the improved animal production building of the invention and by the method of the invention with a combination of (1) animal density (2) properly directed and balanced ventilation, (3) manure deposition into a bulking moisture absorbing agent contained in the manure processing area below the animal production area, (4) combination drainage and forced air piping arrangement in the floor of the manure processing area (5) an optional mechanism to periodically mix the manure with the bulking agent that may also provide a method for finishing product removal, (6) a waste water collection system and storage area to keep free liquid out of the waste processing area, and (7) finished product storage area which may or may not be part of the building structure in many cases. By the improved animal production building method of processing animal manure improved feed conversions and carcass quality and daily gain may be achieved.

While a specific embodiment of the invention has been shown and described herein for purposes of illustration, the protection afforded by any patent which may issue upon this application is not strictly limited to the disclosed embodiment; but rather extends to all structures and arrangements which fall fairly within the scope of the claims which are appended hereto:

What is claimed is:

1. An animal production building comprising animal living quarters designed for optimal animal density, said quarters having at least a partially slatted floor, a manure deposition area directly beneath said slatted floor, said deposition area having a floor, a lower ventilation system in said deposition area floor facilitating the movement of air through the manure in said deposition area, said lower ventilation system having elongated pits in said floor of said manure deposition area, said pits being spaced apart and generally parallel to each other, aeration tile being positioned within said pits and operatively connected a source of air, and an air exhaust system in said deposition area by which air which has passed through said manure and has passed through said animal living quarters is exhausted from said building, whereby animal life can be enhanced and manure may be processed for further use.

2. The animal production building of claim 1 further comprising a manure mixer in said deposition area.

3. The animal production building of claim 2 further comprising manure and manure bulking agent in said deposition area, said manure and manure bulking agent being mixed periodically.

4. The animal production building of claim 3 wherein said manure and said manure bulking agent are less than about 60% weight moisture.

5. The animal production building of claim 1 further comprising an animal watering system in said animal living quarters, said animal watering system having animal waterers with basins therebeneath to catch all waste water from said waterers, and a water drainage system in said deposition area floor connected to said basins to remove water from said living quarters and said deposition area and the manure therein.

6. The animal production building of claim 1 wherein said animal living quarters is a hog finishing or other animal production facility, said facility having a floor, said slatted floor being a portion of said facility floor, said facility floor adjacent to said slatted floor being a pen floor.

7. The animal production building of claim 1 wherein said animal living quarters is a chicken coop, and said partially slatted floor being a walkway.

8. The animal production building of claim 1 wherein said animal living quarters is a cattle barn, said cattle barn having a floor, said slatted floor being said cattle barn floor.

9. The animal production building of claim 1 further comprising upward ventilation system allowing air to move downwardly through said animal quarters, said downwardly moving air of said upper ventilation system increases in volume to cool said animal living quarters when said temperature of said animal living quarters is too high.

10. The animal production building of claim 9 wherein said air exhaust system is sized to exhaust from said building the air flowing downwardly through said animal quarters and the air flowing through said deposition area without altering the direction of air flow through said animal quarters and said deposition area.

11. The animal production building of claim 1 wherein said animal living quarters is positioned between an attic and said deposition area, said attic having a floor permeable to air flow therethrough, said upper ventilation system moving air downwardly through said animal living quarters through said attic floor and said slatted floor to maintain a desired temperature and air quality and to obtain air flow through said quarters downwardly.

12. The animal production building of claim 1 wherein said manure deposition area includes a manure bulking containment area directly below said slatted floor.

13. The animal production building of claim 1 further comprising a waste water storage facility, said drainage system being operatively connected to said waste water storage facility.

14. The animal production building of claim 1 wherein said air exhaust system is sized to maintain the flow of air through said animal living quarters downwardly toward said manure deposition area and the flow of air through the manure in said deposition area, and both said air moving downwardly through said animal quarters and said air moving upwardly or downwardly through the manure in said deposition area out of said building.

15. An animal production building comprising animal living quarters designed for optimal animal density, said quarters having at least a partially slatted floor, an upper ventilation system allowing air to move through said animal quarters, a manure deposition area directly beneath said slatted floor, said deposition area having a floor, a lower ventilation system in said deposition area floor facilitating the movement of air through the manure in said deposition area, a water removal system in said deposition area floor for removing free moisture from said deposition area and the manure therein, an air exhaust system in said deposition area by which air which has passed through said manure and has passed through said animal living quarters is exhausted from said building, whereby animal life can be enhanced and manure may be processed for further use, an animal watering system in said animal living quarters, said animal watering system having animal waterers with basins thereebeneath to catch all waste water from said waterers, and a drain system connecting said basins to said water removal system, said upper ventilation system moving air through said slatted floor to maintain a desired temperature and air quality and to obtain air flow through said quarters, said air exhaust system being sized to exhaust from said building the air flowing through said animal quarters and the air flowing through said deposition area without altering the direction of air flow through said animal quarters and said deposition area, said lower ventilation system having elongated pits in said deposition area floor, said pits being spaced apart and generally parallel to each other, tile positioned within said pits and extending longitudinally thereof.

16. An animal production building comprising animal living quarters designed for optimal animal density, said quarters having at least a partially slatted floor, an upper ventilation system allowing air to move through said animal quarters, a manure deposition area directly beneath said slatted floor, said deposition area having a floor, a lower ventilation system in said deposition area floor facilitating the movement of air through the manure in said deposition area, a water removal system in said deposition area floor for removing free moisture from said deposition area and the manure therein, an air exhaust system in said deposition area by which air which has passed through said manure and has passed through said animal living quarters is exhausted from said building, whereby animal life can be enhanced and manure may be processed for further use, an animal watering system in said animal living quarters, said animal watering system having animal waterers with basins thereebeneath to catch all waste water from said waterers, and a drain system connecting said basins to said water removal system, said air exhaust system being sized to exhaust from said building the air flowing through said animal quarters and the air flowing through said deposition area without altering the direction of air flow through said animal quarters and said deposition area, an air blower, said air blower being operatively connected to said removal system, said removal system having an air plenum, said removal system having a drain, whereby water may be drained from manure in said deposition area through said system and air may be moved through manure in said deposition area through said plenum to dry and at least partially ferment said manure as desired.

17. A method of processing animal waste comprising placing animal living quarters over an animal waste deposition area, depositing animal waste in said deposition area, passing air through said animal waste in said deposition area, and mixing said waste with a bulking agent, drying said animal waste, and processing said animal waste into a product for a broad range of uses.

18. The method of processing animal waste of claim 17 further comprising the steps of housing said animals in a building, said building having animal living quarters positioned over an animal waste deposition area, removing animal waste from said living quarters and depositing the same in said deposition area and outwardly of said building to constantly provide the animals living in said building the fresh air and clean living quarters, providing said animals with feed and water, said water being contained in an animal watering device, removing excess water from said animal living quarters by a drainage system whereby said animals are raised in said animal living quarters in clean and dry animal pens optimately ventilated for maximum production.

19. The method of claim 17 wherein said depositing step includes allowing said animal waste to pass through a floor in said animal quarters over said manure deposition area.

20. The method of claim 17 wherein said depositing step includes washing said animal quarters with water and draining said water through a floor in said animal living quarters, said perforated floor being directly over said deposition area.

21. The method of claim 17 wherein removing said free water includes providing said deposition area with a floor, and a water drainage system in said floor.

22. The method of claim 17 wherein said bulking agent is chosen from the group consisting of straw, rice hulls, wood chips, sawdust, leaves, shredded newspaper, and other absorbent and porous materials compatible with soil enhancement.

23. The method of claim 17 further comprising processing of said animal waste in a dry form.

24. The method of claim 17 wherein said animal living quarters is cooled by passing air downwardly through said animal living quarters into said animal waste deposition area.

25. The method of claim 17 wherein said drying step includes the biological fermentation and aerobic composting of said animal waste in said deposition area.

26. The method of claim 17 further comprising controlling the temperature and air flow through said animal waste in said deposition area.

27. An animal production building comprising animal living quarters designed for optimal animal density, said quarters having at least a partially slatted floor, a manure deposition area directly beneath said slatted floor, said deposition area having a floor, a lower ventilation system in said deposition area floor facilitating the movement of air through the manure in said deposition area, a water removal system in said deposition area floor for removing free moisture from the said deposition area and the manure therein, an air exhaust system in said deposition area by which air which has passed through said manure and has passed through said animal living quarters is exhausted from said building, an air blower operatively connected to said removal system, said removal system having an air plenum, said removal system having a drain, whereby water may be drained from manure in said deposition area through said system and air may be moved through manure in said deposition area through said plenum to dry and at least partially ferment said manure as desired, whereby animal life can be enhanced and manure may be processed for further use.

28. A method of processing animal waste comprising placing animal living quarters over an animal waste deposition area, depositing animal waste in said deposition area, drying said animal waste, and processing said animal waste into a product for a broad range of uses, said depositing step includes allowing said animal waste to pass through a floor in said animal quarters over said deposition area, said drying step includes passing air through said animal waste in said deposition area, exhausting air from said animal living quarters and said deposition area, and mixing said waste with a bulking agent.

29. The animal production building of claim 28 further comprising valving operatively connected to said water removal system, said water removal system being an air plenum when said valving is closed, said water removal system being a drain when said valving is open.

* * * * *